United States Patent
Chien et al.

(10) Patent No.: US 6,853,417 B2
(45) Date of Patent: Feb. 8, 2005

(54) SLANT REFLECTOR WITH BUMP STRUCTURE AND FABRICATING METHOD THEREOF

(75) Inventors: Chin-Cheng Chien, Tainan (TW); Cheng-Jen Chu, Ilan (TW)

(73) Assignee: Chi Mei Optoelectronics Corp. (TW)

( * ) Notice: Subject to any disclaimer, the term of this patent is extended or adjusted under 35 U.S.C. 154(b) by 119 days.

(21) Appl. No.: 10/178,523

(22) Filed: Jun. 25, 2002

(65) Prior Publication Data

US 2003/0043321 A1 Mar. 6, 2003

(30) Foreign Application Priority Data

Aug. 31, 2001 (TW) .................................... 90121709 A

(51) Int. Cl.$^7$ ............................................. G02F 1/1335
(52) U.S. Cl. ......................................................... 349/113
(58) Field of Search .......................................... 349/113

(56) References Cited

U.S. PATENT DOCUMENTS

| | | | |
|---|---|---|---|
| 4,519,678 A | * 5/1985 | Komatsubara et al. | ...... 349/160 |
| 6,163,353 A | * 12/2000 | Ting | ............................ 349/113 |
| 6,452,653 B1 | * 9/2002 | Yamanaka et al. | .......... 349/113 |

FOREIGN PATENT DOCUMENTS

JP              200105370        4/2000

* cited by examiner

*Primary Examiner*—Karl D. Frech
*Assistant Examiner*—Jamara A. Franklin
(74) *Attorney, Agent, or Firm*—Rabin & Berdo, P.C.

(57) ABSTRACT

A method of fabricating a slant reflector with a bump structure, includes the steps of: providing a substrate; forming a layer of photosensitive material on the substrate; patterning the photosensitive material to form a plurality of trapezoidal bumps that have different bottom areas and that are joined to each other at their bottoms; and smoothing the trapezoidal bumps to form a bump structure with an inclined angle. The invention utilizes a photo-mask with a particular pattern and optical diffraction to fabricate the bump structure in a simple way.

19 Claims, 6 Drawing Sheets

SLANT REFLECTOR WITH BUMP STRUCTURE AND FABRICATING METHOD THEREOF

This application incorporates by reference to Taiwan application Serial No. 90121709, filed Aug. 31, 2001.

BACKGROUND OF THE INVENTION

1. Field of the Invention

The invention relates in general to a slant reflector with a bump structure and a fabricating method thereof, and more particularly to a slant reflector with bump structure applied in a reflective type liquid crystal display (LCD).

2. Description of the Related Art

In the recent years, not only the brightness but also the viewing angle has become importand for reflective type liquid crystal displays (LCD) in the commercial market. How to develop a reflective type LCD with high brightness and a wide viewing angle is a very important issue for the manufacturers and researchers.

FIG. 1 represents the reflectance distribution of a conventional reflector. The reflectance is measured by an optical detection system. The reflector is set up horizontally, and surface thereof is smooth. It is assumed that an angle of incidence of the incident light arriving at the surface of reflector is 20 degree. According to optical theory, the angle of reflectance of the reflected light is −20 degree. Hence, the maximum reflectance $R_1$ occurs at the viewing angle of −20 degree, and the curve of reflectance distribution is very narrow, mostly in the region around −20 degree, as shown in FIG. 1.

However, the ideal LCD should represent the maximum reflectance at a viewing angle of 0 degrees, and distribute portions of the reflected light at a wide range of the other viewing angles. To shift the curve of FIG. 1 towards the left, another conventional way is to slant the reflector for changing the light path. For example, the reflector can be slanted until the angle between the surface of reflector and the level is 10 degrees, so that the original incident light at 20 degree of incidence can be reflected at the angle of 0 degrees, as demonstrated in FIG. 2. FIG. 2 represents the reflectance distribution of another conventional reflector. The reflector is set up with an inclined angle (10 degrees), and the surface thereof is smooth. The maximum reflectance $R_1$ occurs at the viewing angle of 0 degrees, but the curve of the reflectance distribution is still narrow, mostly in the region around 0 degrees. The objective of the reflective type LCD with wide viewing angle has not been achieved.

In order to solve the problem, in which the reflectance over concentrates at a certain angle, a further conventional way is provided by forming numerous bumps on the slant reflector. FIG. 3 represents the reflectance distribution of a further conventional reflector. The reflector is set up with an inclined angle (10 degrees), and there are numerous bumps formed on the surface of reflector. A high reflectance is detected around the angle of 0 degree due to the slanted reflector. Also, parts of reflectance are detected in a wide range of viewing angles since the normals on each point of the bump are not parallel. Comparing the results of FIG. 2 and FIG. 3, the maximum reflectance $R_2$ of FIG. 3 is lower than the maximum reflectance $R_1$ of FIG. 2, but the reflectance distribution of FIG. 3 is wider than that of FIG. 2. Therefore, an LCD adopting the slant reflector with bump structure possesses two attractive features—high brightness and a wide viewing angle. A conventional process for making a slant reflector with a bump structure has been presented. In this conventional process, a photo-mask with a single slit is provided, and multi-step exposure is performed. First, a photo-resist on the substrate is exposed to UV (Ultraviolet) light at an intensity of $L_1$ for a time $t_1$, and an exposed area A is formed. Second, the photo-mask is shifted, and the photo-resist is exposed by the UV light at an intensity of $L_2$ for a time $t_2$, to form an exposed area B. Then, the photo-mask is shifted and the exposure is performed, as depicted before. The steps are repeated. Either by setting equal the exposing time and the light intensity $L_1 > L_2 > \ldots$, or by setting equal the intensity and the exposing time $t_1 > t_2 > \ldots$, the size of exposing areas are controlled at the order of A>B> . . . Subsequently, the photo-resist is developed to form a ladder-like look. Then, the ladder-like photo-resist is heated to make it reflow, and becomes a bump with a smooth surface.

However, the conventional process for making a slant reflector with a bump structure has drawbacks. For example, the photo-mask needs to be shifted over and over again. Also, the position of the photo-mask, UV light intensity or the UV duration time needs to be adjusted while the photo-mask is shifted. It is very time-consuming, and the production cost is consequently raised. Furthermore, forming a bump with an inclined angle requires moving the photo-mask and exposing for several times. In a practical application, numerous bumps are demanded for forming a rough surface of slant reflector, so as to enhance the light scattering effect. Hence, the conventional process is not suitable for the mass-production-scale.

SUMMARY OF THE INVENTION

It is therefore an object of the invention to provide a slant reflector with a bump structure and a fabricating method thereof by optical diffraction, so that the fabricating method is simplified and the light scattering effect is improved. Also, a reflective type LCD adopting the slant reflector with bump structure of the invention possesses the advantageous of high brightness and wide viewing angle.

According to the objective of the invention, a method of fabricating slant reflector with bump structure is provided, and at least comprising the steps of: providing a substrate; forming a photosensitivity material layer on the substrate; patterning the photosensitivity material layer to form a plurality of bumps which the bumps have different bottom area and the bottoms of the bumps are joined to each other; and smoothing the bumps to form a bump structure with an inclined angle.

The step of patterning the photosensitivity material layer includes exposing and developing the photosensitivity material layer. A photo-mask provided for exposing the photo-sensitivity material layer has m groups of patterns (m≧1, m is positive integral). Each group of pattern includes a plurality of opaque bars which the opaque bars have different width, and there is an opaque strip in a slit of the adjacent opaque bars. After exposing and developing, the bottoms of bumps are joined to each other, and the bumps are arranged orderly from large bottom area to small bottom area. The smoothing step is performed by baking the bumps, thereby the reflowing bumps forms a bump structure with an inclined angle. Each bump structure comprises a plurality of contiguous bumps arranged from high to low, large to small. Numerous bump structures are randomly, or orderly formed on the substrate.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
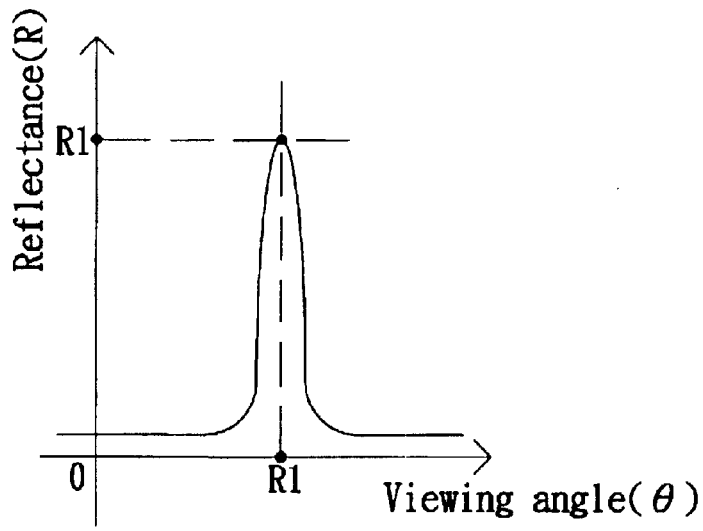
FIG. 1 represents the reflectance distribution of a conventional reflector.
Figure 2:
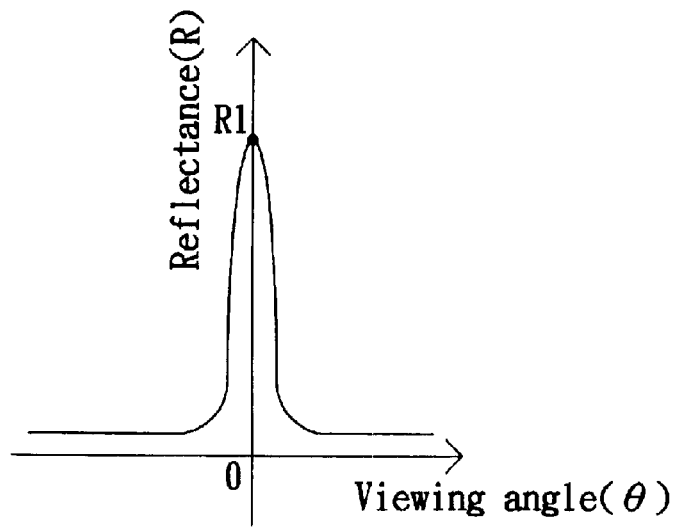
FIG. 2 represents the reflectance distribution of another conventional reflector.
Figure 3:
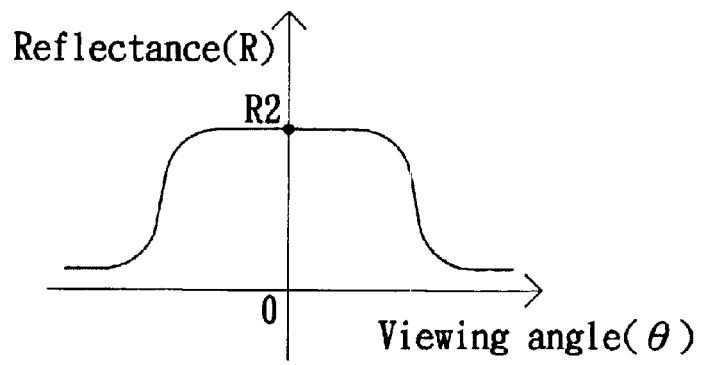
FIG. 3 represents the reflectance distribution of a further conventional reflector.

In the present invention, a photo-mask with multi-slits pattern is provided for exposing and developing a photosensitive or photosensitivity material (such as photoresist) by optical diffraction. Thus, a number of groups of patterns are formed on the photosensitivity material. Each group of patterns comprises a number of bumps, and the bottoms of the bumps are joinedto each other and the bumps are arranged from high to low, large to small. Then, a smoothing process is applied on the bumps, such as melting the bumps by baking followed by reflowing, to form a contiguous and smooth bump structure with an inclined angle.

The slant reflector with a bump structure of the invention can be applied in a reflective type liquid crystal display (LCD). The bump structure with an inclined angle on the substrate can further be covered by a metal film to reflect light. Since the reflective metal film has the same profile as the bump structure underneath, the light entering the reflective type LCD can be reflected in various angles by the metal film; therefore, the attractive features, such as high brightness and wide viewing angle, of the reflective type LCD can be achieved.

The slant reflector with bump structure and the fabricating method thereof according to the invention are described below. It will be appreciated that the drawings and illustration of the embodiments may slightly vary without departing from the main concepts as disclosed herein. Also, to avoid obscuring the invention, well-known elements not directly relevant to the invention are not shown or described. Accordingly, the specification and the drawing are to be regard as an illustrative sense rather than a restrictive sense.

First Embodiment

In the first embodiment of the invention, a photo-mask with multi-slits is provided for forming the slant reflector with bump structure of the invention. The photo-mask has m groups of patterns ($m \geq 1$, m is a positive integer), and each group of pattern includes n bars having different width ($n \geq 2$, n is positive integral). Besides, at least one strip is built in a slit of the adjacent bars.

Figure 4:
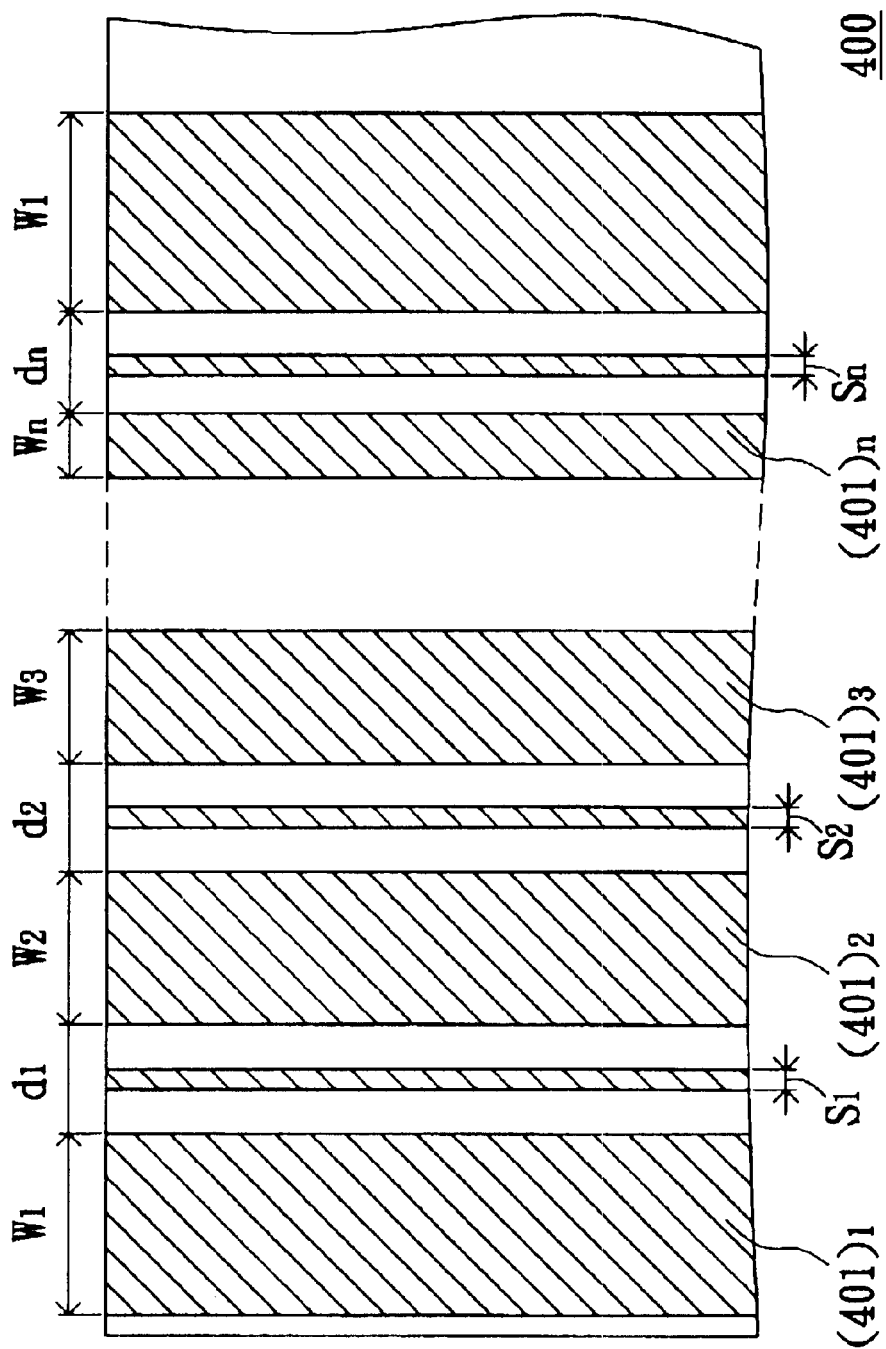
FIG. 4 is a partial top view of a photo-mask according to the first embodiment of the invention.

FIG. 4 is a partial top view of a photo-mask according to the first embodiment of the invention. The photo-mask 400 includes m groups of patterns. Each group of patterns includes n bars which are denoted as $(401)_1$, $(401)_2$, $(401)_3$, ..., $(401)_n$, and the width of bars are $W_1$, $W_2$, $W_3$, ..., $W_n$, respectively. One strip built in a slit of the adjacent bars is illustrated herein. The slits between the bars are $d_1$, $d_2$, $d_3$, ..., $d_n$ in width, and the strips are $s_1$, $s_2$, $s_3$, ..., $s_n$ in width, respectively. M groups of patterns are arranged one by one.

Next, the steps of pattern transformation are performed through the photo-mask 400 of FIG. 4. In the following description, it is assumed that n=4, $d_1=d_2=d_3= \ldots =d_n=d$, and $s_1=s_2=s_3, \ldots =s_n=s$, for the purpose of clear demonstration.

Figure 5A:
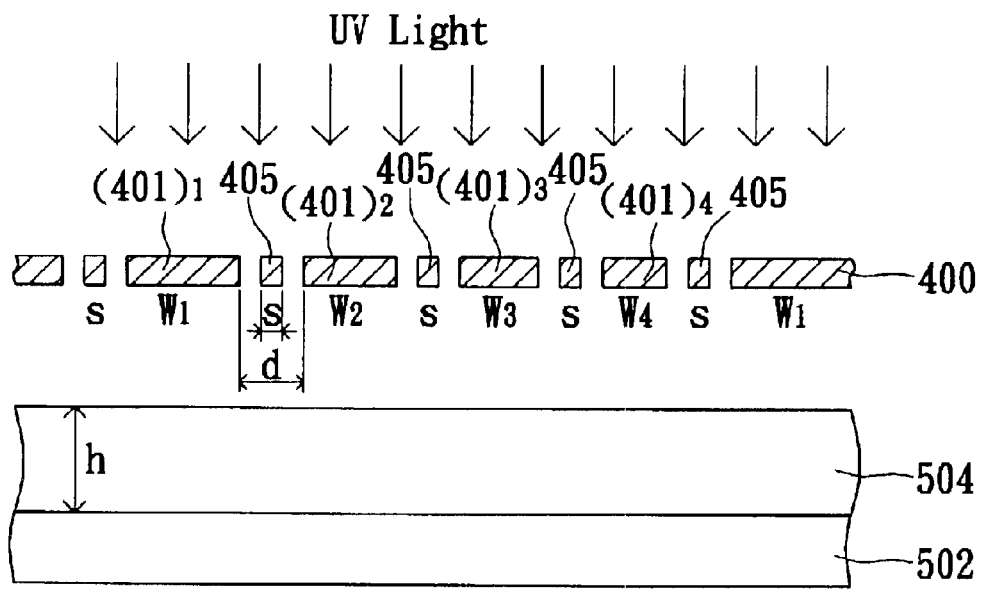
FIG. 5A~FIG. 5C is a method of fabricating slant reflector with bump structure according to the first embodiment of the invention.
Figure 5B:
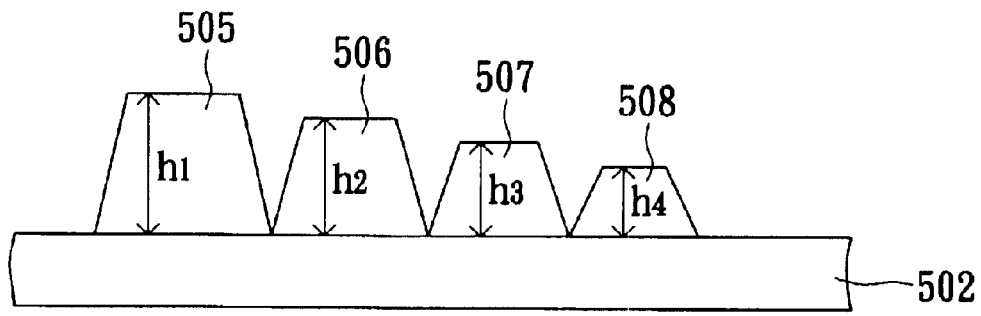
Figure 5C:
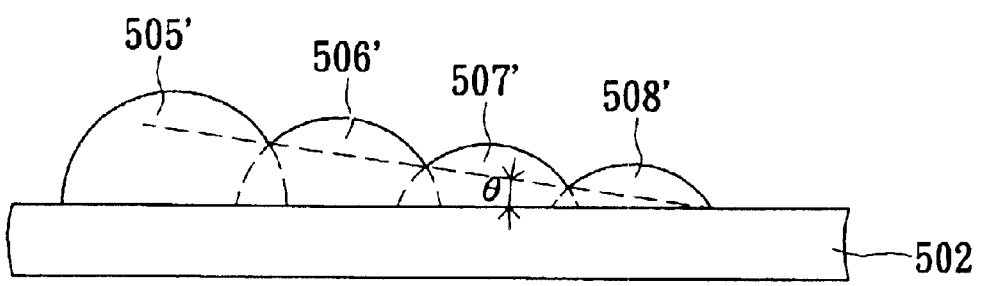

FIG. 5A~FIG. 5C is a method of fabricating slant reflector with bump structure according to the first embodiment of the invention. The substrate 502 is coated with the photosensitivity material, such as photo-resist 504, and then the photo-resist undergoes the steps of UV (Ultraviolet) exposure and development. It is assumed that the photo-resist 504 is a positive photo-resist dissolving in the developer. The portions of the photo-mask 400 marked by oblique lines represents the opaque regions. The opaque regions of photomask 400 include not only the bars $(401)_1$, $(401)_2$, $(401)_3$, $(401)_4$ in width of $W_1$, $W_2$, $W_3$, $W_4$, but also the strips 405 in the slits of adjacent bars. For example, the width d of a slit is about 4 μm, and the width s of a strip 405 is about 1 μm; hence, the distance between the strip 405 and closest bar is about 1.5 μm ((4−1)/2). Since the portions of photo-resist 540 shielded by the opaque bars $(401)_1$, $(401)_2$, $(401)_3$, $(401)_4$ are not exposed to UV radiation, it is not dissolved in the developer. On the contrary, the portions of photo-resist 540 under the slits of the photo-mask 400 are exposed to UV radiation, so as to dissolve in the developer after photolithography.

The existence of strip 405 separates the original slit into two narrower slits. The UV light is diffracted through the photo-mask 400 with two adjustable slits. As the light waves spread out from the slit, they meet which results in interference between the two waves. This optical interference phenomenon is known as "Double-slit diffraction". Consequently, the portions of photo-resist 540 associated with the slits are under exposed. As shown in FIG. 5B, the profile of photo-resist 540 is shaped like trapezoids after development, and trapedoizal photo-resist regions 505, 506, 507, and 508 are formed. Also, the bottom trapezoidal photo-resist regions are joined to each other.

Additionally, the photo-resist region with the larger bottom area has the greater height after exposing and developing. For example, a photo-resist region originally 14 μm wide is higher than 7 μm wide after exposing and developing. Accordingly, the width of bars on the photo-mask: 400 of the embodiment is $W_1 > W_2 > W_3 > W_4$, so that the bottom area of the photo-resist regions is 505>506>507>508, and the height of the photo-resist regions is $h_1 > h_2 > h_3 > h_4$ after exposing and developing.

Next, the step of melting those trapezoidal photo-resist regions 505, 506, 507, and 508 is performed, followed by the smoothing step. The photo-resist can be composed of resin, sensitized for photoactivity, and an appropriate solvent. Therefore, the solvent of the photo-resist is vaporized and decreased to the lower content, if a heating procedure such as baking is applied on the photo-resist after developing. The advantage of decreasing the solvent content of the photo-resist is to enhance the adherence of photo-resist to the substrate. Subsequently, the heating temperature is increased up to the glass transition temperature of the photo-resist, so it will be softened like melting glass, and the surface is going to be smooth due to reflow. Since the bottoms of the trapezoidal photo-resist regions 505, 506, 507, and 508 (FIG. 5B) are joined to each other, four contiguous bumps (FIG. 5C) will be formed after performing the step of smoothing. Furthermore, the trapezoidal photo-resist regions 505, 506, 507, and 508 of FIG. 5B are arranged from high to low, so the reflowed photo-resist 505', 506', 507', and 508' forms a slant profile with an inclined angle θ, as shown in FIG. 5C. In this preferred embodiment, a plurality of trapezoidal photo-resist regions is heated at the temperature ranged from 200□ to 230□ for 1 hours, approximately. However, the invention is not limited to this. In practical applications, the heating temperature and the duration time depend on the characteristics of the photo-resist.

Figure 6:
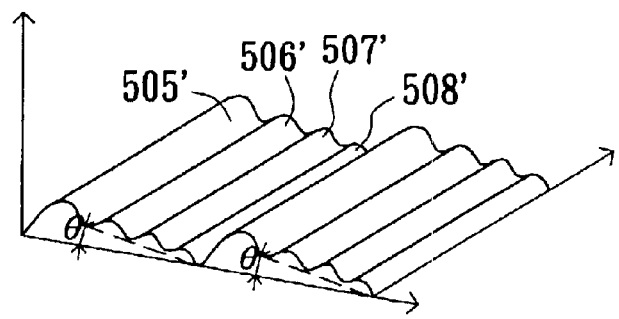
FIG. 6 is a stereographic, cross-sectional drawing of the slant reflector with bump structure according to the first embodiment of the invention.

FIG. 6 is a perspective, cross-sectional drawing of the slant reflector with a bump structure according to the first embodiment of the invention. It is assumed that the photo-mask 400 includes two groups of patterns (m=2). According to the fabricating method of FIG. 5A~FIG. 5C, two groups of bump structures with an inclined angle θ are produced, and each group of bump structures comprises four contiguous bumps (n=4) that are arranged from high to low, large to small.

The slant reflector with a bump structure of the invention can be applied in a reflective type LCD. After the fabricating step of FIG. 5C, a metal film is further deposited over the substrate 502, and covers the surface of photo-resist regions 505', 506', 507', and 508' (of FIG. 5C, and FIG. 6). Since the reflective metal film has an undulated profile the same as the bump structure underneath, the light entering the reflective type LCD can be reflected at various angles by the metal film; therefore, the reflective type LCD possesses attractive features, such as high brightness and a wide viewing angle, in the commercial market.

According to the description above, the slant bump structure of the first embodiment comprises m groups of bump structures including a plurality of bumps (m×n), and each group of bump structures including n bumps that are arranged from high to low, large to small, in order to form a contiguous bump structure with an inclined angle.

Although each group of bump structure having n bumps is illustrated in this embodiment, the invention is not limited herein. Each group of bump structures can also have different number of bumps; for example, the first group having 5 bumps, the second group having 6 bumps, the third group having 4 bumps, etc.

Second Embodiment

Another photo-mask with multi-slits is provided for fabricating the slant reflector with bump structure of the invention. After fabrication, the bump aggregation on the photo-resist is increased. Hence, the light scattering effect is better if the slant reflector with bump structure of this embodiment is applied in the reflective type LCD.

The photo-mask has m groups of patterns (m≧1, m is positive integer), and each group of pattern includes n bars (n≧2, n is positive integer). The n bars have different widths and are arranged from wide to narrow. Similarly, one strip built in a slit of the adjacent bars is taken for illustration hereafter. M groups of patterns can be arranged on the photo-mask randomly, or orderly as forming an array, such as m' groups in length and n' groups in width (m=m'×n'). In the following description, it is assumed that 4 groups of patterns are randomly arranged and each group includes 3 bars (m=4, n=3), for example.

Figure 7:
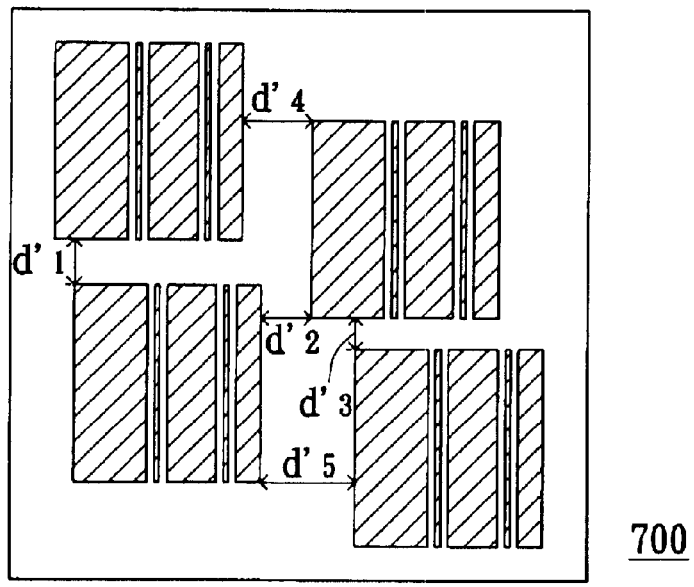
FIG. 7 is a partial top view of a photo-mask according to the second embodiment of the invention.

FIG. 7 is a partial top view of a photo-mask according to the second embodiment of the invention. There are 4 groups (m=4) of patterns arranged on the photo-mask 700, and each group of pattern includes 3 bars (n=3) arranged from wide to narrow. Also, in the adjacent bars further has a strip.

Next, the steps of pattern transformation are performed through the photo-mask 700 of FIG. 7. The fabricating method of the second embodiment is similar to that in the first embodiment except the photo-mask 400 is replaced with the photo-mask 700. As shown in FIG. 5A~FIG. 5C, the photo-resist undergoes three steps of exposing, developing, and smoothing. Also, the photo-resist is a positive photo-resist dissolving in the developer, and the portions of the photo-mask (700) marked by oblique lines represents the opaque regions. Additionally, the distance is controlled between each group of patterns, denoted as $d_1'$, $d_2'$, $d_3'$, $d_4'$, $d_5'$ in FIG. 7. After melting and reflowing, each groups of photo-resist is able to joint together, and forms contiguous bump structure over the substrate.

Figure 8:
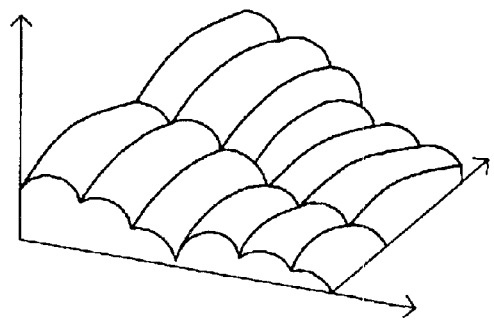
FIG. 8 is a stereographic, cross-sectional drawing of the slant reflector with bump structure according to the second embodiment of the invention.

FIG. 8 is a perspective, cross-sectional drawing of the slant reflector with a bump structure according to the second embodiment of the invention. In the same fabricating steps, using photo-mask 700 can produce more bumps than using photo-mask 400, and create a rougher surface of photo-resist. Certainly, a bump structure similar to FIG. 8 can also be formed if m groups of patterns are arranged on the photo-mask orderly as an array, such as m' groups in length and n' groups in width (m=m'×n').

Figure 9A:
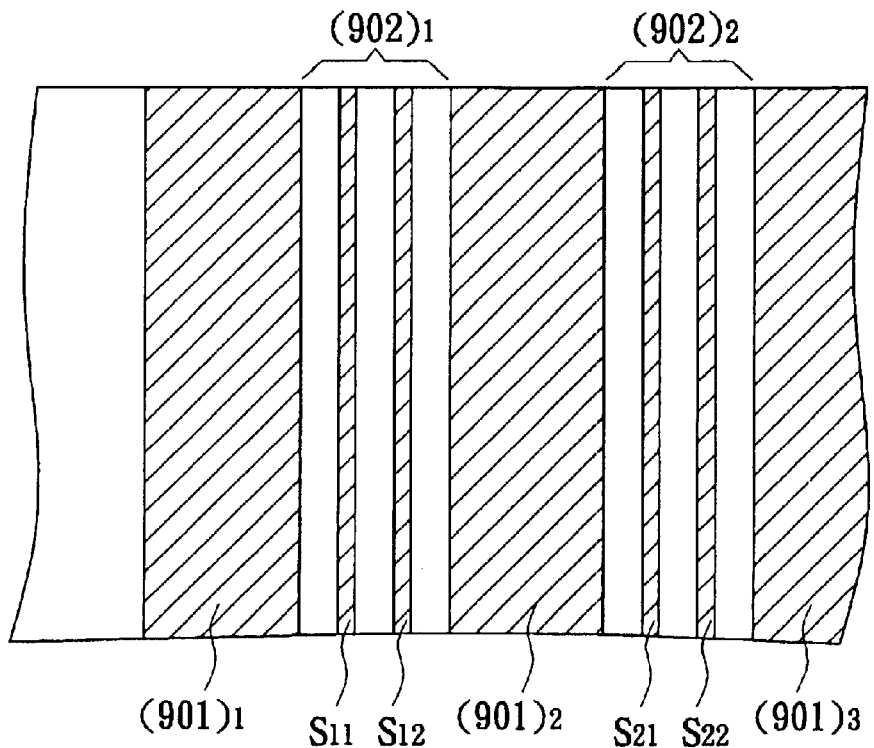
FIG. 9A is a partial top view of the third photo-mask of the invention.
Figure 9B:
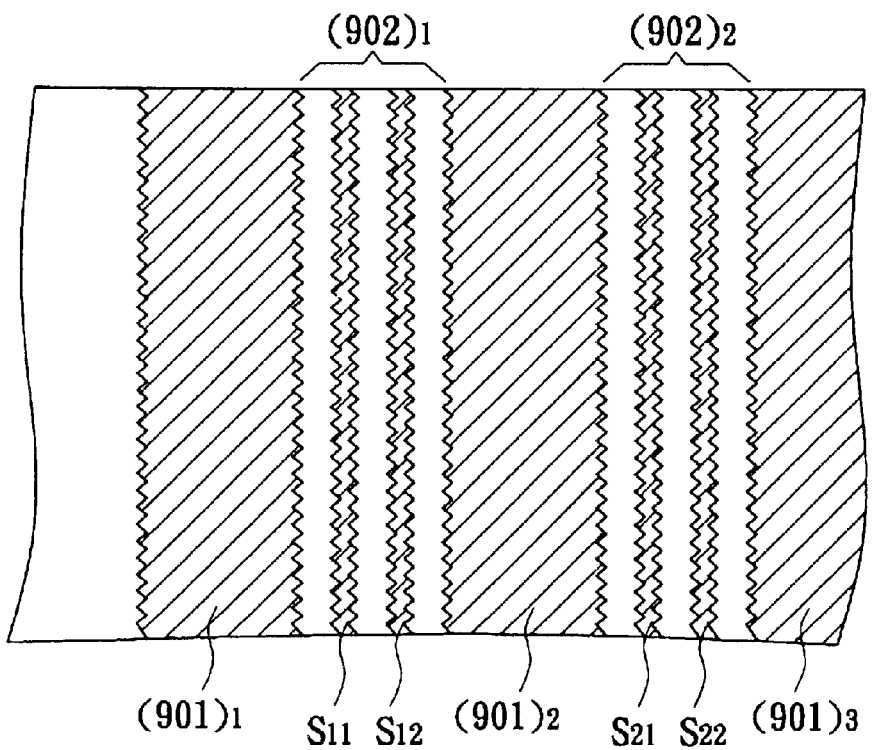
FIG. 9B is a partial top view of the fourth photo-mask of the invention.
Figure 10:
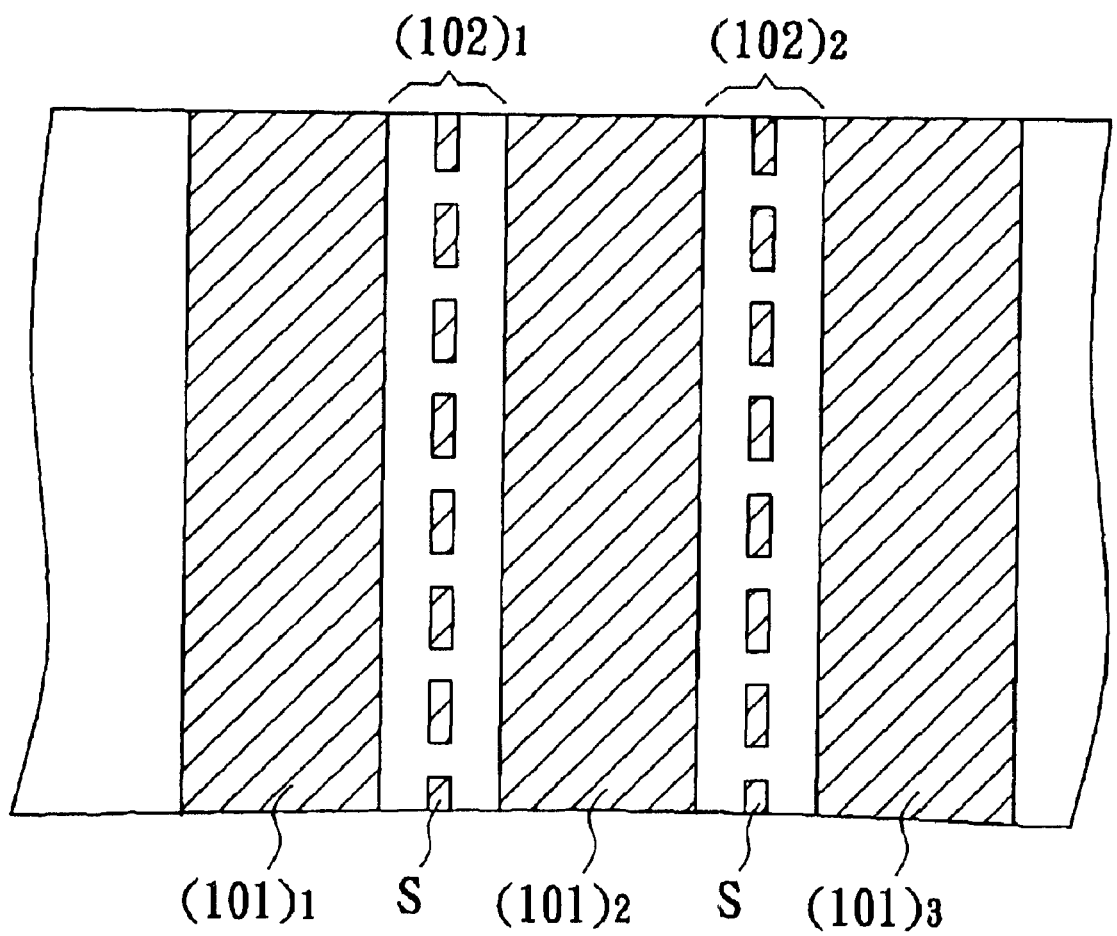
FIG. 10 is a partial top view of the fifth photo-mask of the invention.

Although the patterns of photo-masks 400 and 700 are taken for illustration in the aforementioned examples, the invention is not limited herein. For instance, m groups of patterns can be arranged randomly on the photo-mask and each group can include a plurality of opaque bars arranged from wide to narrow; or m groups of patterns arranged on the photo-mask in an array. The number of opaque bars in each group can be equal or different. Also, the photo-mask is not limited to the double-slit pattern of FIG. 4. For example, two strips $S_{11}$ and $S_{12}$ can be disposed in parallel between the bars $(901)_1$ and $(901)_2$, as shown in FIG. 9A. The strips $S_{11}$ and $S_{12}$ in FIG. 9A could be designed to have zigzag edges, as shown in FIG. 9B. Additionally, as shown in FIG. 10, a discontinuous strip S can be formed in the slits $(102)_1$ and $(102)_2$. The bump structure of the invention can be successfully achieved by those designs of a photo-mask with multi-slits.

Therefore, the photo-resist on the to-be-bared area needs to be removed totally to prevent poor-resistance and poor circuit contact. When all the substrate undergoes the exposure by UV light with ordinary intensity, the UV light through the photo-mask with multi-slits is diffracted, known as double-slit diffraction. Hence, the quantity of UV light reaching the photo-resist is decreased, which is similar to the condition of under exposure. The bottoms of photo-resist are joined to each other after developing. Consequently a contiguous bump structure with an inclined angle is formed after melting. Moreover, in the general process for making a TFT LCD, there are some areas of the substrate that should be bared, i.e. to form contact holes for contacting the circuit. To provide a bared area of the substrate, an associated opening area is formed on the photo-mask so that all the UV light passes for completely exposure. Simply said, the slant reflector with bump structure of the invention and removal of photo-resist on the to-be-bared areas of the substrate can be achieved simultaneously by using UV light with ordinary intensity.

In another aspect, the fabricating method for a slant reflector with a bump structure of the invention can adopt a photo-mask having a first region and a second region to expose the photo-resist on the substrate. The first region of photo-mask is a transparent region with multi-slits, so that a first part of the photo-resist is under-exposed to form a concave portion. The second region of photo-mask is an opaque region, so that a second part of the photo-resist is shielded from the UV light. After developing, the second part of the photo-resist is connected to each other through the first part of the photo-resist. After smoothing the photo-resist, a contiguous deformity structure with a predetermined inclined angle is produced.

According to the foregoing description, the invention utilizes a photo-mask with multi-slits and a simple process comprising the steps of exposure, developing, and smoothing to form a slant reflector with numerous groups of bump structures having a great light scattering effect. For the reflective type LCD employing the slant reflector with bump structures of the invention, high brightness and a wide viewing angle can be achieved. Additionally, the more the groups of patterns on the photo-mask are, the higher the bump aggregation is, and the better the effect of light scattering is.

In the preferred embodiments described herein, the advantages of the slant reflector with bump structure and the fabricating method thereof according to the invention are summarized as follows:

1. The bump aggregation of a slant reflector with bump structure of the invention is higher than that of a conventional reflector, and has a better light scattering effect. Therefore, a reflective type LCD employing a slant reflector with bump structures of the invention has a high brightness and a wide viewing angle.

2. Only one exposing procedure is required in the fabrication of the slant reflector with bump structure. The simplified process, saving production cost and time, is very suitable for mass-production.

3. An exposure at ordinary intensity can be used to form the slant reflector with bump structure and to-be-bared areas on the substrate, simultaneously. The timesaving fabricating process has great economical benefit.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of fabricating a slant reflector with a bump structure, comprising the steps of:

providing a substrate;

forming a layer of photosensitive material on the substrate;

patterning the photosensitive material to form a plurality of bumps which have bottoms with different bottom areas and which have heights that differ depending on the bottom area, such that the larger the bottom area of one of the bumps, the larger the height of said one of the bumps, the bumps being joined at the bottoms; and smoothing the bumps to form the bump structure, the bump structure having an inclined angle.

2. The method of fabricating a slant reflector with a bump structure according to claim 1, wherein the step of smoothing the bumps comprises the steps of:

melting the bumps by baking; and reflowing the bumps to form the bump structure with the inclined angle.

3. The method of fabricating a slant reflector with a bump structure according to claim 1, wherein the step of patterning comprises a single exposure step and a development step.

4. A method of fabricating a slant reflector with a bump structure, comprising the steps of:

providing a substrate;

forming a layer of photosensitive material on the substrate;

patterning the photosensitive material to form m groups of patterns ($m \geq 1$, m is positive integer), wherein each group includes a plurality of bumps which have bottoms with different bottom areas and which have heights that differ depending on the bottom area, such that the larger the bottom area of one of the bumps, the larger the height of said one of the bumps, the bumps being joined at the bottoms; and smoothing the bumps to form the bump structure, the bump structure having an inclined angle.

5. The method of fabricating a slant reflector with a bump structure according to claim 4, wherein the step of patterning the photosensitive material includes exposing and developing the photosensitive material.

6. The method of fabricating a slant reflector with a bump structure according to claim 5, wherein a photo-mask is provided for exposing the photosensitive material.

7. The method of fabricating a slant reflector with a bump structure according to claim 6, wherein the photo-mask has m groups of patterns ($m \geq 1$, m is positive integer), and each group of patterns includes a plurality of opaque bars which have different widths, and there is an opaque strip in a slit between adjacent opaque bars.

8. The method of fabricating a slant reflector with a bump structure according to claim 5, wherein the step of exposing the photosensitive material is conducted in a single exposure step.

9. The method of fabricating a slant reflector with a bump structure according to claim 4, wherein the joined bumps in each group are arranged in an orderly manner, from the bump with the largest bottom area to the bump with the smallest bottom area.

10. The method of fabricating a slant reflector with a bump structure according to claim 4, wherein the m groups of patterns formed of the photosensitive material are arranged in a predetermined order.

11. The method of fabricating a slant reflector with a bump structure according to claim 4, wherein the m groups of patterns formed of the photosensitive material are randomly arranged.

12. The method of fabricating a slant reflector with a bump structure according to claim 4, wherein each group of patterns includes n bumps ($n \geq 2$, n is positive integer).

13. The method of fabricating a slant reflector with a bump structure according to claim 12, wherein m groups of bump structures with the inclined angle are formed after smoothing, and each group includes n bumps ($n \geq 2$, n is positive integer).

14. A method of fabricating a slant reflector with a bump structure, comprising the steps of:

provecting a substrate;

forming a layer of photosensitive material on the substrate;

patterning the photosensitive material to form a plurality of bumps which have bottoms with different bottom areas and which have heights that differ depending on the bottom area, such that the larger the bottom area of one of the bumps, the larger the height of said one of the bumps, the bumps being joined at the bottoms;

smoothing the bumps to form the bump structure, the bump structure having an inclined angle; and forming a reflective metal film on the substrate to cover the bump structure with the inclined angle.

15. The method of fabricating a slant reflector with a bump structure according to claim 14, wherein the step of patterning the photosensitive material includes exposing and developing the photosensitive material.

16. The method of fabricating a slant reflector with a bump structure according to claim 14, wherein the step of smoothing the bumps comprises the steps of:

melting the bumps by baking; and reflowing the bumps to form the bump structure with the inclined angle.

17. The method of fabricating a slant reflector with a bump structure according to claim 14, wherein the slant reflector with a bump structure is incorporated in a reflective liquid crystal display (LCD).

18. A method of fabricating a slant reflector with a bump structure, comprising the steps of:

forming a layer of photosensitive material on a substrate;

exposing the photosensitive material through a photo-mask having a first region that is substantially transparent except for a multi-slits structure and having a second region that is opaque; and developing the photosensitive material, so that a first part of the photosensitivity material layer forms a concave portion, the first part of the photosensitive material being associated with the first region of the photo-mask; and smoothing the photosensitive material to form a contiguous deformity structure with a predetermined inclined angle.

19. A method of fabricating a slant reflector with a bump structure, comprising the steps of:

forming a layer of photosensitive material on a substrate, the layer of photosensitive material having a first part and a second part;

exposing the photosensitive material through a photo-mask having a first region that is substantially transparent except for a multi-slits structure and having a second region that is opaque, the first region of the photo-mask being associated with the first part of the layer of photosensitive material and the second region of the photo-mask being associated with the second part of the layer of photosensitive material;

developing the photosensitive material, so that the second part of the layer of photosensitive material is joined to the first part; and smoothing the photosensitive material to form a contiguous deformity structure with a predetermined inclined angle.

* * * * *